Patented June 20, 1944

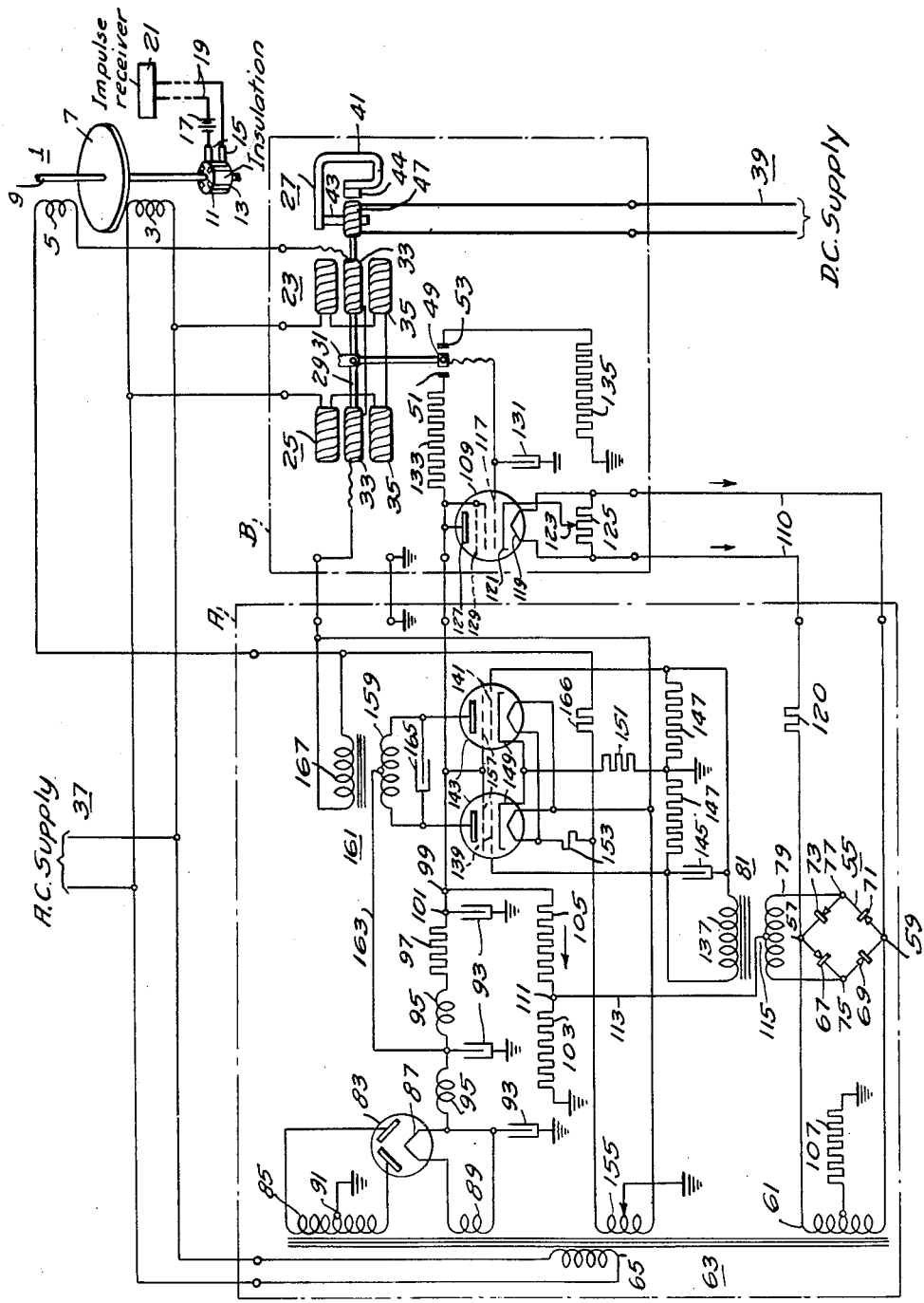

2,351,982

UNITED STATES PATENT OFFICE 2,351,982

ELECTRICAL INVERTER

Bernard E. Lenehan, Bloomfield, N. J., assignor to Westinghouse Electric & Manufacturing Company, East Pittsburgh, Pa., a corporation of Pennsylvania Application March 25, 1942, Serial No. 436,077

11 Claims. (Cl. 177—351)

This invention relates to systems for maintaining a predetermined relation between a pair of quantities, and it has particular relation to a system for producing an alternating-current quantity which bears a predetermined relation to a variable quantity.

In some cases it is desirable to produce an alternating-current quantity which bears a predetermined relation to some variable quantity. For example, such practice permits the adoption of sturdy and reliable alternating-current translating devices for response to variable quantities other than alternating-current quantities.

In accordance with the invention, an alternating-current quantity is produced which is balanced against a variable quantity to maintain a predetermined relation therebetween. A deviation from the predetermined relation between the quantities is employed for varying the charge in an energy storage device such as a capacitor. A charge on the capacitor is employed for controlling the balance of an alternating-current bridge. Unbalance of the bridge in either of two directions produces one of two alternating voltages differing 180° in phase. The output of the bridge circuit is employed for restoring the balance between the alternating-current quantity and the variable quantity.

It is, therefore, an object of the invention to provide a system for maintaining a predetermined relation between a variable quantity and an alternating-current quantity.

It is a further object of the invention to provide a system for maintaining a predetermined relation between a pair of quantities wherein the charge in an energy storage device is employed for controlling the predetermined relation between the quantities.

It is another object of the invention to provide a system for maintaining a predetermined relation between a pair of quantities wherein in response to a deviation of said quantities from said predetermined relation an alternating-current bridge may be unbalanced in either of two directions to provide compensating voltage outputs differing 180° in phase to restore the quantities to the predetermined relation.

Other objects of the invention will be apparent from the following description taken in conjunction with the accompanying drawing, in which the single figure is a schematic view of a system embodying the invention.

Referring to the drawing, there is shown a translating device 1 which is to be energized by an alternating-current quantity. In the specific embodiment herein discussed, the translating device may take the form of a conventional induction-type impulse transmitter. This transmitter may include a voltage winding 3 and a current winding 5 which are designed, when energized, to produce a shifting magnetic field. A conductive armature 7 is positioned for rotation in the shifting magnetic field on a shaft 9. A permanent magnet (not shown) is generally employed for damping rotation of the armature 7.

To produce impulses proportional to the rate of rotation of the armature 7 a suitable commutator may be mounted on the shaft 9. This commutator may take the form of a cylinder 11 of insulating material in which spaced conductive segments 13 are embedded. A pair of fixed brushes 15 are connected in series with a battery 17 or other source of energy. When each of the conductive segments 13 bridges the brushes 15, an impulse is produced in a circuit 19 which may transmit the impulses to an impulse receiver 21. The construction and operation of such an impulse transmitter are well understood in the art.

In order to energize the translating device 1 in accordance with a variable quantity, a balance device 23 is provided, having an alternating-current element 25 and a control element 27 which is energized in accordance with the variable quantity. These elements operate differentially on a balance arm 29 which is pivotally mounted on a stationary support 31.

The alternating-current element 25 may be of the watt type having current windings 33 mounted on the balance arm 29 for movement relative to fixed voltage windings 35.

The alternating-current element 25 is energized in accordance with the energization of the translating device 1. To this end, the current windings 33 and 5 of the alternating-current element and the translating device are connected in series for energization from a common source of alternating current. Although the voltage windings 35 and 3 of the alternating-current element and the translating device may be energized from the same source as the current windings they are illustrated as connected in parallel for energization from a source 37 of alternating-current energy. This source may operate at any desired voltage and frequency. For the purpose of discussion, it is assumed that the source 37 is a 115-volt source operating at a frequency of 60 cycles per second.

The control element 27 may be energized in accordance with any variable quantity in order to control the energy supplied to the alternating-current element 25 and the translating device 1. For the purpose of discussion it is assumed that the control element is a direct-current element designed for energization from a circuit 39. This circuit 39 represents a circuit from a current-type telemetering transmitter. Current flowing in the circuit 39 may represent any desired quantity such as power or watts. In the conventional current type telemetering system, current flowing in the circuit 39 may be of the order of a few milliamperes in magnitude.

The control element 27 includes a permanent magnet 41 having pole pieces 43 and 44. A winding 47 surrounds the pole 43 and is mounted for movement with respect thereto. As shown, the winding 47 is mounted on the balance arm 29 and is energized from the circuit 39.

The windings of the alternating-current element 25 and of the control element 27 are so connected that they apply opposing torques to the balance arm 29. If these torques are equal a movable contact 49 carried by the balance arm 29 may occupy a position intermediate two fixed contacts 51 and 53. If the current applied to the winding 47 decreases or rises in value, the resulting variation in torque applied to the balance arm 29 actuates the movable contact 49 into engagement with one of the contacts 51 and 53. The alternating-current element 25 and the control element 27 are of conventional construction and are well known in the art.

Movement of the movable contact 49 into engagement with either of the fixed contacts 51 or 53 is employed for modifying the alternating current supplied to the alternating-current element 25 and the translating device 1 to maintain a predetermined relation between the alternating current and current flowing in the circuit 39. For this purpose, movement of the movable contact is employed for controlling the balance of an alternating-current bridge circuit 55 having input terminals 57 and 59 connected across a secondary winding 61 of a transformer 63. This transformer may have a primary winding 65 connected for energization from the source 37.

The bridge circuit 55 includes arms having resistances which vary as a function of the current flowing therethrough and having rectifiers associated therewith for permitting current to flow through each arm in only one direction. Since barrier layer rectifiers, such as copper-oxide rectifiers, have resistances which vary inversely with current density therein, such rectifiers may be employed in the arms of the bridge circuit, and four barrier layer rectifiers 67, 69, 71 and 73 are employed for this purpose. By inspection of the drawing, it will be observed that the rectifiers are connected to permit the flow of current in the same direction around the loop formed by the arms of the bridge circuit. The bridge circuit 55 has output terminals 75 and 77 connected across the primary winding 79 of a transformer 81. If copper-oxide rectifiers are employed the maximum voltage per rectifier disc preferably should not exceed 0.3 volt. As a specific example, if the secondary winding 61 has an output of 6.3 volts, each of the rectifiers 67, 69, 71, and 73 may comprise sixteen discs each 5/8" in diameter to provide a voltage per disc of about 0.278 volt.

To provide the required unbalance of the bridge circuit 55, the system includes means for applying direct current to the terminals of the bridge circuit. Such direct current may be derived from a conventional rectifier tube 83 having plates connected to the terminals of a secondary winding 85 of the transformer 63 and having a filament 87 energized from a secondary winding 89 associated with the transformer 63. In accordance with conventional practice, a center tap 91 is provided for the secondary winding 85 and is illustrated as connected to ground. The rectifier circuit illustrated provides full-wave rectification.

The output of the rectifier tube 83 passes through a filter of any desired type. In the specific filter illustrated, capacitors 93, inductive reactances 95, and a resistor 97 are employed for removing ripples from the output of the rectifier tube 83.

For applying direct current to the bridge circuit 55, this bridge circuit is connected across the output terminals of a Wheatstone bridge circuit having one input terminal 99 connected to a terminal 101 of the filter and having a second input terminal represented by ground. The arms of this Wheatstone bridge circuit include resistors 103, 105 and 107. The fourth arm of the Wheatstone bridge circuit includes the plate-to-cathode resistance of an electronic tube 109.

One output terminal 111 of the Wheatstone bridge circuit is connected to the output terminals of the alternating-current bridge circuit 55 through a conductor 113, and a center tap 115 of the primary winding 79.

The remaining output terminal of the Wheatstone bridge circuit, represented by the conductors 110 which energize the filament of the tube 109, may be considered to be connected to both of the input terminals 57 and 59 of the alternating-current bridge 55.

From an inspection of the drawing, it will be observed that the direct-current voltage applied across the arms of the alternating-current bridge 55 is controlled by the bias of the control grid 117 of the electronic tube 109. If the current flowing through the electronic tube 109 is such that the Wheatstone bridge formed by the tube and resistors 103, 105 and 107 is balanced, no direct-current voltage appears across the rectifiers 67, 69, 71 and 73 of the alternating-current bridge circuit.

If the bias on the tube 109 is such that the Wheatstone bridge is unbalanced in a direction making the output terminal 111 of the bridge positive with respect to the remaining output terminal of the Wheatstone bridge circuit, direct current flows through the rectifiers 69 and 73.

Since the barrier layer rectifiers 69 and 73 have resistances which vary inversely with the density of current therein, the flow of direct current therethrough lowers the resistance of the barrier layer rectifiers 69 and 73 below that of the remaining rectifiers. Consequently, the alternating-current bridge circuit 55 is unbalanced and an alternating-current voltage appears across the primary winding 79.

Let it be assumed next that the Wheatstone bridge circuit represented by the tube 109 and the resistors 103, 105 and 107 is unbalanced in a direction such that the output terminal 111 is negative with respect to the remaining output terminal of the Wheatstone bridge circuit. In such a case, direct current flows through the rectifiers 67 and 71. As the result of this flow of direct current, the resistance of the rectifiers 67 and 71 falls to a value lower than that of the rectifiers 69 and 73. Consequently, the alternating-current bridge circuit 55 is unbalanced in the opposite direction and an alternating-current voltage appears across the primary winding 79. Depending on the direction of unbalance of the alternating-current bridge circuit 55, one of two alternating-current voltages which differ in phase by 180° appears across the primary winding 79.

The electronic tube 109 may be of any suitable amplifying type. As illustrated, the tube 109 has a filament 119 energized from the secondary winding 61 over the conductors 110 through a suitable resistor 120. A cathode 121 is connected to a center tap 123 on a resistor 125 which is connected across the terminals of the filament 119. The plate 127 and screen grid 129 of the tube 109 are connected to the terminal 101 of the filter.

The bias on the control grid 117 of the electronic tube 109 is controlled by the charge on an energy storage device such as a capacitor 131. This capacitor has a charge which depends on the position of the movable contact 49 of the balance device 23. When the movable contact 49 engages the fixed contact 51, the capacitor 131 is connected across the output of the filter through a resistor 133. Under these conditions, the resistor 133 permits the charge on the capacitor 131 to increase slowly. The increase in charge of the capacitor 131 is accompanied by an increase in the positive bias of the tube 109.

When the movable contact 49 engages the fixed contact 53, the capacitor 131 is connected across a resistor 135. This resistor permits the charge in the capacitor 131 to decrease slowly, thereby decreasing the positive bias of the electron tube 109. Preferably, the capacitor 131 is of a high quality type capable of retaining its charge for a long period of time.

From this discussion, it is clear that the balance of the Wheatstone bridge circuit formed by the tube 109 and the resistors 103, 105 and 107 is controlled by the movable contact 49 of the current balance device. The constants of the system may be so selected that current flows in the plate circuit of the tube 109 over the entire range of operation of the system. When the bias on the tube 109 drops below a predetermined value, the alternating-current bridge circuit 55 is unbalanced in one direction to apply a first alternating-current voltage across the primary winding 79. When the bias applied to the tube 109 rises above the predetermined value, the alternating-current bridge circuit 55 is unbalanced in an opposite direction to apply a second alternating-current voltage across the primary winding 79 which differs in phase by 180° from the first alternating-current voltage. The magnitude of the alternating-current voltage in each case depends on the magnitude of the deviation of the bias on the tube 109 from the predetermined value thereof.

The output of the transformer 81 may be employed for modifying the energization of the translating device 1 and the alternating-current element 25. For this purpose, the secondary winding 137 of the transformer 81 may have its terminals connected respectively to the control grids 139 and 141 of a pair of electronic tubes 143 arranged for push-pull amplification. As illustrated, a capacitor 145 and a pair of resistors 147 are connected across the secondary winding 137. The capacitor 145 may be employed to reduce harmonics in the output of the transformer 81 and to provide a proper phase relation for the output of the tubes 143. It may be proportioned to be approximately in resonance with the inductance of the winding 137. The resistors 147 each have a terminal connected to ground and to the cathodes 149 of the electronic tubes 143 through a resistor 151. The filaments of the electronic tubes 143 may be energized through a suitable resistor 153 from a secondary winding 155 associated with the transformer 63. The tubes 143 include screen grids 157 which are connected to the terminal 101 of the filter.

The plate circuit for the tubes 143 is completed by the primary winding 159 of an output transformer 161 having a center tap connected through a conductor 163 and the inductive reactor 95 to the filament 87 of the rectifier tube. A capacitor 165 is connected across the primary winding 159. The capacitor 165 may be proportioned to correct the power factor of the load circuit of the tubes 143 to 100%. This assures a desirable load for the tubes.

Preferably, the amplifier tubes 143 have linear amplifying characteristics and produce in the secondary winding 167 of the output transformer an alternating-current voltage which is an amplified replica of the voltage applied to the grids of the tubes.

Although the output of the secondary winding 167 may be applied directly to the current windings 33 and 5 of the alternating-current element 25 and the translating device 1, preferably a portion of the energization of these windings is derived directly from a suitable source such as the secondary winding 155 through a suitable impedance, such as resistor 166. In a specific embodiment illustrated in the drawing, the output of the secondary winding 167 serves to buck or boost the output of the secondary winding 155 dependent on the direction of unbalance of the alternating-current bridge circuit 55.

It is believed that the operation of the system illustrated in the drawing is apparent from the foregoing discussion. As previously explained the control element 27 is energized in accordance with the variable control quantity which in this case is direct current. The alternating-current element 25 and the impulse generator 1 both are energized in accordance with the same alternating-current quantity. As long as the alternating-current element 25 and the direct-current control element 27 are balanced, the movable contact 49 remains in its central position and the impulse generator 1 continues to send out impulses at a uniform rate.

If the direct-current quantity supplied through the circuit 39 should increase, the balance of the balance device 23 is destroyed and the movable contact 49 moves into engagement with the fixed contact 51. Such movement of the movable contact connects the capacitor 131 across the filter through the resistor 133. Consequently, the charge in the capacitor 131 increases.

Should the current flowing in the circuit 39 decrease, the balance of the balance device 23 also is destroyed and the movable contact 49 moves into engagement with the fixed contact 53. Engagement of the fixed contact 53 by the movable contact 49 connects the capacitor 131 across the resistor 135 and permits the capacitor to discharge.

A change in the charge in the capacitor 131 varies the bias of the electronic tube 109 and operates to vary the balance of the Wheatstone bridge formed by the tube 109 and resistors 103, 105 and 107 in either of two directions dependent on the direction of variation in charge of the capacitor 131 from a predetermined value.

Since the alternating-current bridge 55 is connected across the output terminals of the Wheatstone bridge formed by the tube 109 of the resistors 103, 105 and 107, a direct-current voltage is applied across the alternating-current bridge having a polarity dependent on the direction of unbalance of the Wheatstone bridge. Depending on the polarity of the direct-current voltage thereacross, the alternating-current bridge circuit 55 has one of two alternating-current outputs varying in phase by 180°.

The alternating voltage output of the alternating bridge circuit 55 is applied to the two tubes 143 which are connected in a push-pull amplifying circuit. The output of the tubes 143 is coupled through the transformer 161 to the secondary winding 155 which energizes the windings of the alternating-current element 25 and the winding 5 of the impulse generator 1. Depending on its phase which is determined by the direct-current voltage across the alternating-current bridge 55, the output of the tubes 143 bucks or boosts the output of the secondary winding 155. This varies the energization of the windings 33 in a direction tending to restore the balance of the balance device 23. When balance is restored, the movable contact 49 returns to its central position and the alternating-current element 25 continues to be energized at the new level. Since the impulse generator 1 is energized in accordance with the energization of the alternating-current element 25, the impulses generated thereby are in accordance with the new level of energization of the alternating-current element. In this manner, the output of the impulse generator 1 bears a predetermined relation to the direct current supplied from the circuit 39.

It should be observed that the output of the tubes 143 operates to buck or boost the output of the secondary winding 155 dependent on the polarity of the direct-current voltage across the alternating-current bridge 55. This permits the full output of the tubes to be utilized in either the bucking or boosting direction and results in efficient utilization of the tubes. It should be observed additionally that the system illustrated in the drawing responds promptly to a change in current flowing through the circuit 39. For this reason, the output of the impulse generator 1 accurately represents the current flowing through the circuit 39.

As well understood in the art, the various parts of the system illustrated in the drawing may vary appreciably. As specific examples, the tube 109 may be a type 6L7 tube which is known in the art as a penta-grid mixer amplifier tube. Each of the resistors 103, 105 and 107 which cooperate with the tube 109 to form a Wheatstone bridge circuit, may have a resistance value of 20,000 ohms. The capacitor 131 may have a capacitance of four microfarads. As previously pointed out, it is desirable that the capacitor 131 be of high quality. The resistors 133 and 135 through which the capacitor 131 is charged and discharged may each have a resistance value of 5 megohms. Type 6L6 tubes may be employed as the amplifying tubes 143. Since the remaining constants of the system are dictated largely by the characteristics of the tubes selected, a further discussion thereof is believed to be unnecessary. If desired, the system may be housed in two electroconductive shielding cabinets A and B, which are both grounded.

Although the invention has been discussed with reference to a specific embodiment thereof, numerous modifications are possible. Therefore, the invention is to be restricted only by the appended claims as interpreted in view of the prior art.

I claim as my invention:

1. In an electrical system for maintaining a predetermined relation between a first variable quantity and a second quantity, a bridge circuit having input terminals and output terminals, said bridge circuit having arms including elements having current-directional characteristics and having impedances which vary with current, a source of alternating-current connected to said input terminals, means for passing direct current through said arms for unbalancing said bridge in a direction and to a magnitude dependent respectively on the direction and magnitude of a deviation of said quantities from a predetermined relation, and means responsive to the output of said bridge circuit for restoring said quantities to a predetermined relation.

2. In an electrical system for maintaining a predetermined relation between a first variable quantity and a second quantity, a plurality of barrier-layer rectifiers, means connecting said rectifiers in a bridge circuit having input and output terminals, said rectifiers forming two uni-directional, oppositely-directed paths between said output terminals, a source of alternating current connected to said output terminals, said bridge circuit being designed when unbalanced to provide an alternating-current output having a phase relationship relative to the voltage of said source which varies in accordance with the specific direction of unbalance of the bridge circuit, means for applying between the input terminals and the output terminals of the bridge circuit a direct-current voltage varying in accordance with said first variable quantity, whereby said direct-current voltages produce a current flow through two arms of said bridge circuit which varies the resistance of said arms and unbalances said bridge circuit, and means responsive to the output of said bridge circuit for restoring said quantities to said predetermined relation.

3. In an electrical system for maintaining a predetermined relation between a first variable quantity and a second quantity, a plurality of barrier-layer rectifiers, means connecting said rectifiers in a bridge circuit having input and output terminals, said rectifiers forming two uni-directional, oppositely-directed paths between said output terminals, a source of alternating current connected to said output terminals, said bridge circuit being designed when unbalanced to provide an alternating-current output having a phase relationship relative to the voltage of said source which varies in accordance with the specific direction of unbalance of the bridge circuit, means for applying between the input terminals and the output terminals of the bridge circuit a direct-current voltage having a polarity and a magnitude which vary respectively in accordance with the direction and magnitude of the deviation of said quantities from a predetermined relation thereof, whereby said direct-current voltage produces a current flow through certain arms of said bridge circuit to vary the impedance of said certain arms and unbalance the bridge circuit in a direction dependent on the polarity of said direct-current voltage, said bridge circuit having alternating-current outputs differing in phase by 180 electrical degrees in dependence on the direction of unbalance of said bridge circuit, and means responsive to the alternating-current output of said bridge circuit for restoring said quantities to said predetermined relation.

4. In an electrical system for maintaining a predetermined relation between a first variable quantity and a second quantity, a plurality of barrier-layer rectifiers, means connecting said rectifiers in a bridge circuit having input and output terminals, said rectifiers forming two unidirectional, oppositely-directed paths between said output terminals, a source of alternating current connected to said output terminals, said bridge circuit being designed when unbalanced to provide an alternating-current output having a phase relationship relative to the voltage of said source which varies in accordance with the specific direction of unbalance of the bridge circuit, means for applying between the input terminals and the output terminals of the bridge circuit a direct-current voltage having a polarity and a magnitude which vary respectively in accordance with the direction and magnitude of the deviation of said quantities from a predetermined relation, whereby said direct-current voltage produces a current flow through certain arms of said bridge circuit to vary the impedance of said certain arms and unbalance the bridge circuit in a direction dependent on the polarity of said direct-current voltage, said last-named means comprising a capacitor, means for varying the charge in said capacitor in accordance with the deviation of said quantities from said predetermined relation, and means responsive to the charge in said capacitor for producing said direct-current voltage, said bridge circuit having alternating-current outputs differing in phase by 180 electrical degrees in dependence on the direction of unbalance of said bridge circuit, and means responsive to the alternating-current output of said bridge circuit for restoring said quantities to said predetermined relation.

5. In an electrical system for maintaining a predetermined relation between a first variable quantity and a second quantity, a plurality of barrier-layer rectifiers, means connecting said rectifiers in a bridge circuit having input and output terminals, said rectifiers forming two unidirectional, oppositely-directed paths between said output terminals, a source of alternating current connected to said output terminals, said bridge circuit being designed when unbalanced to provide an alternating-current output having a phase relationship relative to the voltage of said source which varies in accordance with the specific direction of unbalance of the bridge circuit, means for applying between the input terminals and the output terminals of the bridge circuit a direct current voltage having a polarity and a magnitude which vary respectively in accordance with the direction and magnitude of the deviation of said quantities from a predetermined relation, whereby said direct-current voltage produces a current flow through certain arms of said bridge circuit to vary the impedance of said certain arms and unbalance the bridge circuit in a direction dependent on the polarity of said direct-current voltage, said last-named means comprising a capacitor, means for varying the charge in said capacitor in accordance with the deviation in said quantities from said predetermined relation, an electronic device having a direct-current output controlled by the charge in said capacitor, and means responsive to the direct-current output of said electronic device for producing said direct-current voltage, said bridge circuit having alternating-current outputs differing in phase by 180 electrical degrees in dependence on the direction of unbalance of said bridge circuit, and means responsive to the alternating-current output of said bridge circuit for restoring said quantities to a predetermined relation.

6. In an electrical system for maintaining a predetermined relation between a first variable quantity and a second quantity, a plurality of barrier-layer rectifiers, means connecting said rectifiers in a bridge circuit having input and output terminals, said rectifiers forming two unidirectional, oppositely-directed paths between said output terminals, a source of alternating current connected to said output terminals, said bridge circuit being designed when unbalanced to provide an alternating-current output having a phase relationship relative to the voltage of said source which varies in accordance with the specific direction of unbalance of the bridge circuit, means for applying between the input terminals and the output terminals of the bridge circuit a direct-current voltage having a polarity and a magnitude which vary respectively in accordance with the direction and magnitude of the deviation of said quantities from a predetermined relation, whereby said direct-current voltage produces a current flow through certain arms of said bridge circuit to vary the impedance of said certain arms and unbalance the bridge circuit in a direction dependent on the polarity of said direct-current voltage, said last-named means comprising a capacitor, means for varying the charge in said capacitor in accordance with the deviation in said quantities from a predetermined relation, an electronic device having a direct-current output controlled by a grid element, means connecting said grid element for biasing in accordance with the charge in said capacitor, means producing a first direct voltage controlled by the direct-current output of said electronic device, means for producing a second substantially constant second direct voltage, and connecting means for applying the difference between said first and second direct voltages between the output and input terminals of said bridge circuit.

7. In an electrical system for producing an alternating-current quantity controlled by a variable quantity, a capacitor, an electronic device having an output controlled by the bias of a grid element, means connecting said grid element for biasing in accordance with the charge in said capacitor, a bridge circuit having a pair of input terminals and a pair of output terminals, said bridge circuit comprising arms having barrier-layer rectifiers therein connected to permit the flow of current around said bridge circuit, means for applying an alternating voltage to said input terminals, means for applying between said pair of input terminals and said pair of output terminals a direct-current voltage dependent on the difference between said output of said electronic device and a substantially constant quantity, said direct-current voltage producing a direct-current flow through said bridge circuit which cooperates with the resistance variation of said barrier-layer rectifiers with respect to current densities therein to unbalance said bridge circuit in either of two directions in dependence on the polarity of said direct-current voltage, whereby either of two output alternating voltages differing 180° in phase appears across the output terminals of said bridge circuit dependent on the polarity of said direct-current voltage, means for comparing said variable quantity to the alternating voltage appearing across the output terminals of said bridge circuit, and means controlled by said comparing means in response to a deviation of said variable quantity and the alternating voltage output of said bridge circuit from a predetermined relation for varying the charge in said capacitor.

8. In an electrical system for producing an alternating-current quantity controlled by a variable quantity, a capacitor, an electronic device having an output controlled by the bias of a grid element, means connecting said grid element for biasing in accordance with the charge in said capacitor, a bridge circuit having a pair of input terminals and a pair of output terminals, said bridge circuit comprising arms having barrier-layer rectifiers therein connected to permit the flow of current around said bridge circuit, means for applying an alternating voltage to said input terminals, means for applying between said pair of input terminals and said pair of output terminals a direct-current voltage dependent on the difference between said output of said electronic device and a substantially constant quantity, said direct-current voltage producing a direct-current flow through said bridge circuit which cooperates with the resistance variation of said barrier-layer rectifiers with respect to current densities therein to unbalance said bridge circuit in either of two directions in dependence on the polarity of said direct-current voltage, whereby either of two output alternating voltages differing 180° in phase appears across the output terminals of said bridge circuit dependent on the polarity of said direct-current voltage, said output alternating voltages having a magnitude dependent on the magnitude of said direct-current voltages, means combining the output voltage of said bridge circuit with a substantially constant alternating voltage to produce a resultant voltage, means for comparing said variable quantity to said resultant voltage, and means controlled by said comparing means in response to a deviation of said variable quantity and the said resultant voltage from a predetermined relation for varying the charge in said capacitor.

9. In an electrical system for producing an alternating-current quantity controlled by a variable quantity, a substantially constant source of alternating current, a capacitor, an electronic device having an output controlled by the bias of a grid element, means connecting said grid element for biasing in accordance with the charge in said capacitor, a bridge circuit having a pair of input terminals and a pair of output terminals, said bridge circuit comprising arms having barrier-layer rectifiers therein connected to permit the flow of current around said bridge circuit, means for applying an alternating voltage to said input terminals, means for applying between said pair of input terminals and said pair of output terminals a direct-current voltage dependent on the difference between said output of said electronic device and a substantially constant quantity, said direct-current voltage producing a direct-current flow through said bridge circuit which cooperates with the resistance variation of said barrier-layer rectifiers with respect to current densities therein to unbalance said bridge circuit in either of two directions in dependence on the polarity of said direct-current voltage, whereby either of two output alternating voltages differing 180° in phase appears across the output terminals of said bridge circuit dependent on the polarity of said direct-current voltage, said output alternating voltages having a magnitude dependent on the magnitude of said direct-current voltage, means combining the output voltage of said bridge circuit with a substantially constant alternating voltage to produce a resultant voltage, a balance device comprising a control element responsive to said variable quantity and an alternating-current element opposing said control element, translating means, means for energizing said translating means and said alternating-current element in part from said substantially constant source of alternating current, means for energizing said translating means and said alternating-current element in part in accordance with said resultant voltage, and means controlled by said balance device for varying the charge in said capacitor.

10. In a device for producing alternating current controlled by a variable direct-current quantity, a capacitor, an electronic device having an output controlled by the bias of a grid element, means connecting said grid element for biasing in accordance with the charge in said capacitor, a bridge circuit having a pair of input terminals and a pair of output terminals, said bridge circuit comprising arms having barrier-layer rectifiers therein connected to permit the flow of current around said bridge circuit, means for applying an alternating voltage to said input terminals, means for applying between said pair of input terminals and said pair of output terminals a direct-current voltage dependent on the difference between said output of said electronic device and a substantially constant quantity, said direct-current voltage producing a direct-current flow through said bridge circuit which cooperates with the resistance variation of said barrier-layer rectifiers with respect to current densities therein to unbalance said bridge circuit in either of two directions in dependence on the polarity of said direct-current voltage, whereby either of two output alternating voltages differing 180° in phase appears across the output terminals of said bridge circuit dependent on the polarity of said direct-current voltage, said output alternating voltages having a magnitude dependent on the magnitude of said direct-current voltage, electronic amplifying means for amplifying the alternating voltage output of said bridge circuit, means combining the amplified output voltage of said bridge circuit with a substantially constant alternating voltage to produce a resultant voltage having a magnitude dependent on the magnitude and phase of the alternating voltage output of said bridge circuit, a current balance device comprising a control element responsive to said variable direct-current quantity, an alternating-current element having a first energizing winding and a second energizing winding, and a balance element differentially responsive to said control element and said alternating-current element; an alternating-current-operated translating means having a first energizing winding and a second energizing winding; means for energizing said first windings from said substantially constant source of alternating current; means for energizing said second windings in accordance with said resultant voltage; and means controlled by said balance element for connecting said capacitor to a source of direct current or to a discharge circuit dependent on the direction of deviation of said resultant voltage and said variable direct-current quantity from a predetermined relation.

11. In a system for maintaining a predetermined relation between a variable quantity and an alternating-current quantity, a direct-current bridge circuit having input terminals and output terminals, an alternating-current bridge circuit comprising current directional arms having impedances varying as a function of current flowing therethrough, means connecting said alternating-current bridge to said direct-current bridge circuit to be unbalanced in either of two directions depending on the polarity of the voltage appearing across the output terminals of said direct-current bridge circuit, means for applying an alternating voltage across the input terminals of said alternating-current bridge circuit, and balance means responsive to a deviation of said variable quantity and the alternating output of said alternating-current bridge circuit from a predetermined relation for varying the balance of said direct-current bridge circuit to maintain a predetermined relation between the alternating output of said alternating-current bridge circuit and said variable quantity.

BERNARD E. LENEHAN.